US012600475B2

(12) United States Patent
Turk et al.

(10) Patent No.: US 12,600,475 B2
(45) Date of Patent: Apr. 14, 2026

(54) PLACEMENT SYSTEM

(71) Applicant: Tusas—Turk Havacilik Ve Uzay Sanayii Anonim Sirketi, Kahramankazan (TR)

(72) Inventors: Fatih Turk, Kahramankazan (TR); Alican Secgin, Kahramankazan (TR); Murat Bacanak, Kahramankazan (TR)

(73) Assignee: Tusas—Turk Havacilik Ve Uzay Sanayii Anonim Sirketi, Kahramankazan (TR)

( * ) Notice: Subject to any disclaimer, the term of this patent is extended or adjusted under 35 U.S.C. 154(b) by 0 days.

(21) Appl. No.: 18/725,205

(22) PCT Filed: Nov. 15, 2022

(86) PCT No.: PCT/TR2022/051290
§ 371 (c)(1),
(2) Date: Jun. 28, 2024

(87) PCT Pub. No.: WO2023/129013
PCT Pub. Date: Jul. 6, 2023

(65) Prior Publication Data
US 2025/0171149 A1     May 29, 2025

(30) Foreign Application Priority Data

Dec. 29, 2021     (TR) ............................... 2021/021541

(51) Int. Cl.
*B64D 7/06*     (2006.01)
*F41A 23/02*     (2006.01)
*F41A 23/52*     (2006.01)

(52) U.S. Cl.
CPC ................ B64D 7/06 (2013.01); F41A 23/02 (2013.01); F41A 23/52 (2013.01)

(58) Field of Classification Search
CPC ............. B64D 7/06; F41A 23/02; F41A 23/52
(Continued)

(56) References Cited

U.S. PATENT DOCUMENTS 5,767,436 A * 6/1998 Sanderson .............. F41A 21/36
89/37.16
8,434,397 B1 5/2013 Deckard et al.
(Continued)

OTHER PUBLICATIONS

International Search Report and the Written Opinion Dated Jun. 21, 2023 From the International Searching Authority Re. Application No. PCT/TR2022/051290. (7 Pages).

*Primary Examiner* — Bret Hayes

(57) ABSTRACT

The present invention relates to a body (2) located on an air vehicle; at least one weapon (W) located on the body (2) to attack a target; a carrier (3) that allows the weapon (W) on the body (2) to be moved and carried as desired by the user; at least one rail (4) which extends longitudinally on the body (2) and allows the carrier (3) to move in the direction it extends; a plurality of housings (5) located on the rail (4); at least one pin (6) located on the carrier (3) so as to be form-fitted and opposite to the housings (5); the pin (6) having a locked position (I) in which the pin (6) contacts the housing (5), thereby fixing the carrier (3) on the rail (4), and a free position (II) in which the user triggers the pin (6) to cut its contact with the housing (5) so that the carrier (3) can be moved and brought on the rail (4).

15 Claims, 6 Drawing Sheets

(58) Field of Classification Search
USPC ............................................ 89/37.16, 37.17
See application file for complete search history.

(56) References Cited

U.S. PATENT DOCUMENTS

| | | | | |
|---|---|---|---|---|
| 9,428,273 B1 | 8/2016 | Serkland et al. | | |
| 10,106,239 B2* | 10/2018 | Woodland | ................ | B64C 1/36 |
| 2004/0060428 A1 | 4/2004 | Sanderson | | |
| 2010/0294120 A1 | 11/2010 | Deckard et al. | | |

* cited by examiner

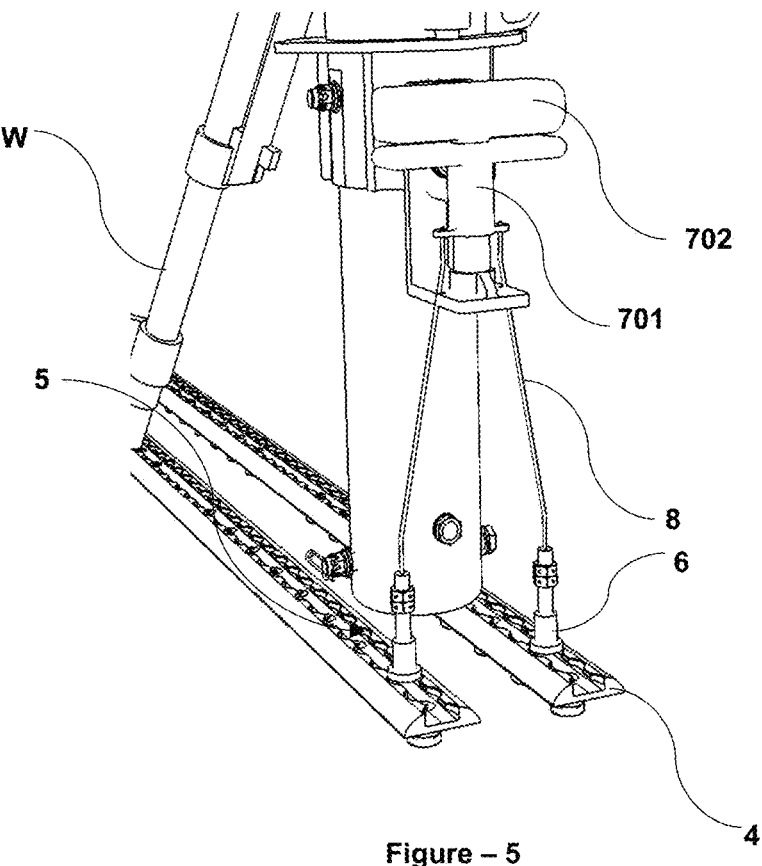
Figure — 5
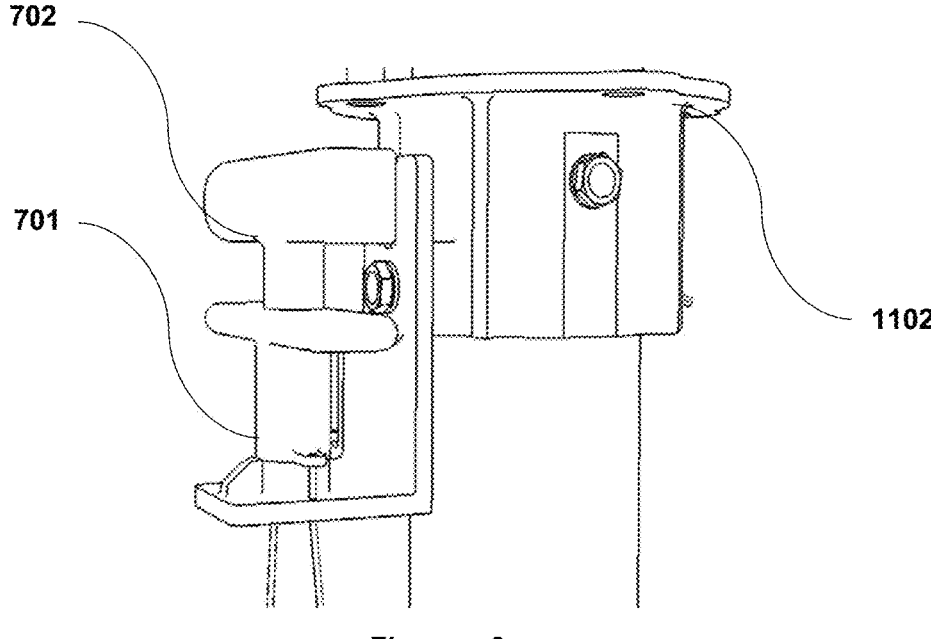
Figure — 6

PLACEMENT SYSTEM

RELATED APPLICATIONS

This application is a National Phase of PCT Patent Application No. PCT/TR2022/051290 having International filing date of Nov. 15, 2022, which claims the benefit of priority of Turkey Patent Application No. 2021/021541 filed on Dec. 29, 2021. The contents of the above applications are all incorporated by reference as if fully set forth herein in their entirety.

FIELD AND BACKGROUND OF THE INVENTION

The present invention relates to a placement system for weapons used on the air vehicle to attack a target.

Various ammunition is used in helicopters to attack the target during an operation. The weapons used for the operation are positioned inside the cabin or outward from the cabin so as to shoot at a position desired by the user. The weapons are intended to be placed inside the helicopter cabin after the shot is fired. Weapons must be positioned to shoot at desired positions.

The United States patent document US2010294120A1, which is included in the known-state of the art, discloses a weapon placement system. According to the invention described in said document, the system suitable for use in an air vehicle, such as a helicopter, comprises a carriage supporting a machine weapon and an ejection gap placed between the carrier.

SUMMARY OF THE INVENTION

A placement system according to the present invention provides a system that allows a user to adjust positions of the weapons easily after the weapons used in military air vehicles are placed on the air vehicle.

Another object of the present invention is to provide a solution for ergonomically positioning the weapons, which are used to attack a target, in the air vehicle cabin.

The placement system realized to achieve the object of the present invention, which is defined in the first claim and other claims dependent thereon, comprises a body provided on a rotary-wing air vehicle, such as a helicopter, used for military purposes; at least one weapon (W) used on the body to attack a target; a carrier that allows the weapon (W) positioned on the body to be moved and/or carried on the body as desired by a user; at least one rail extending its own length on the body, allowing the carrier to be moved by the user in the direction it extends; a plurality of housings located on the rail; at least one pin located on the carrier so as to be form-fitted and opposite to the housings; a locked position (I) in which the carrier is fixed on the rail by the pin contacting the housing; a free position (II) in which the carrier is movably located on the rail when the user pulls the pin out of the housing.

The placement system according to the invention comprises the rail on the carrier, which allows the pin to be moved from the locked position (I) to the free position (II) when triggered by the user, and moves the carrier to a desired position when pin is in the free position (II), wherein the rail allows the pin to be moved to the locked position (I) when the user releases the arm; and the pin which moves on the rail in a direction from the locked position (I) to the free position (II), and contacts the rail so as not to be disengaged from the rail.

In an embodiment of the invention, the placement system comprises at least one wire which is connected on one side to the arm and on the other side to the pin, and moves the pin from the locked position (I) to the free position (II) when the arm is pulled by the user, wherein the wire transmits the trigger to the pin.

In an embodiment of the invention, the placement system comprises a first arm movably located on the carrier; a second arm having the same geometrical form as the first arm and fixed on the carrier such that the first arm is located slidably on the second arm. The arms can preferably be L or T shaped.

In an embodiment of the invention, the placement system comprises a second arm on which the first arm slides, wherein the first arm is located on the second arm to contact the second arm.

In an embodiment of the invention, the placement system comprises a protrusion extending outward from the first arm; a channel located on the carrier, which prevents the first arm from rotating around the axis it extends, wherein the protrusion slides in the channel.

In an embodiment of the invention, the placement system comprises a channel located on the first arm, which prevents the first arm from rotating around the axis it extends, wherein the protrusion extending from the carrier towards the first arm slides in the channel.

In an embodiment of the invention, the placement system comprises a support piece that surrounds the carrier; a first flange with the pin thereon, which at least partially covers the rail and extends from the support piece to the rail, allowing the pin to contact the housing.

In an embodiment of the invention, the placement system comprises a pin spring which surrounds the pin, and pushes the pin towards the housing when the carrier reaches the position desired by the user on the rail, thus allowing the pin to be brought to the locked position (I).

In an embodiment of the invention, the placement system comprises a cover on the first flange, which surrounds the pin and the pin spring.

In an embodiment of the invention, the placement system comprises a first carrier with pin and arm thereon; a second carrier on the body, on which the weapon (W) is located; a movement transfer arm connected on one side to the first carrier and on the other side the second carrier.

In an embodiment of the invention, the placement system comprises a second flange extending outwardly from the first carrier to contact the movement transfer arm located on the first carrier; a locking element that restricts the rotational movement of the movement transfer arm around the direction in which the first carrier extends. It preferably limits rotational movement at approximately right angles.

In an embodiment of the invention, the placement system comprises the body located on the air vehicle which is a helicopter; an extension extending over the second carrier and restricting the movement of the weapon (W) carried by the second carrier on the second carrier, thus preventing the shooting direction of the weapon from being aimed at the helicopter blades.

In an embodiment of the invention, the placement system comprises a movable carrier extending outward from the second carrier and capable of rotating around the axis that the second carrier extends; a chamber detachably mounted on the movable carrier, on which the weapon (W) is located.

In an embodiment of the invention, the placement system comprises the second arm with a "T" shape; the first carrier whose movement is restricted by contacting the second carrier, and which is interlocked with the cylindrical shaped section of the second carrier.

In an embodiment of the invention, the placement system comprises a first protrusion element extending outwardly from the second carrier; a second protrusion element extending outward from the chamber and facing the first protrusion element, allowing the chamber and the second carrier to be fixed.

BRIEF DESCRIPTION OF THE SEVERAL VIEWS OF THE DRAWINGS

A placement system realized to achieve the object of the present invention is illustrated in the attached drawings, in which:

FIG. 5 is a perspective view of the first arm, second arm, rail, weapon, wire and pin.

FIG. 6 is a perspective view of the first arm, second arm and second flange.

DESCRIPTION OF SPECIFIC EMBODIMENTS OF THE INVENTION

Figure 1:
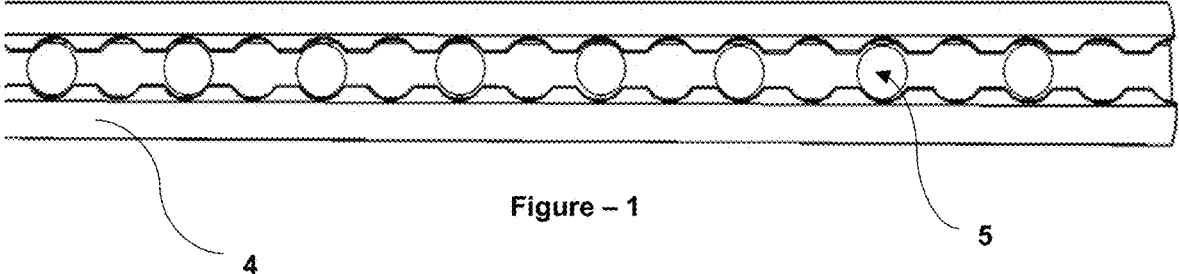
FIG. 1 is a perspective view of the rail and housings.

All the parts illustrated in figures are individually assigned a reference numeral and the corresponding terms of these numbers are listed below:

1. Placement System
2. Body
3. Carrier
   301. First Carrier
   302. Second Carrier
4. Rail
5. Housing
6. Pin
7. Arm
   701. First Arm
   702. Second Arm
8. Wire
9. Protrusion
10. Channel
11. Support Piece
   1101. First Flange
   1102. Second Flange
12. Pin Spring
13. Cover
14. Movement Transfer Arm
15. Locking Element
16. Extension
17. Movable Carrier
18. Chamber

Figure 2:
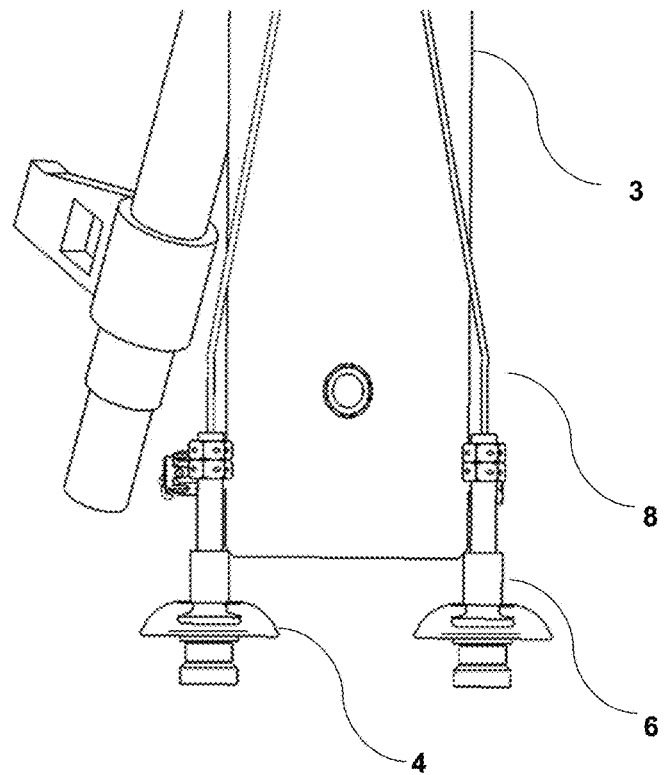
FIG. 2 is a perspective view of the pin in the free position (II).
Figure 3:
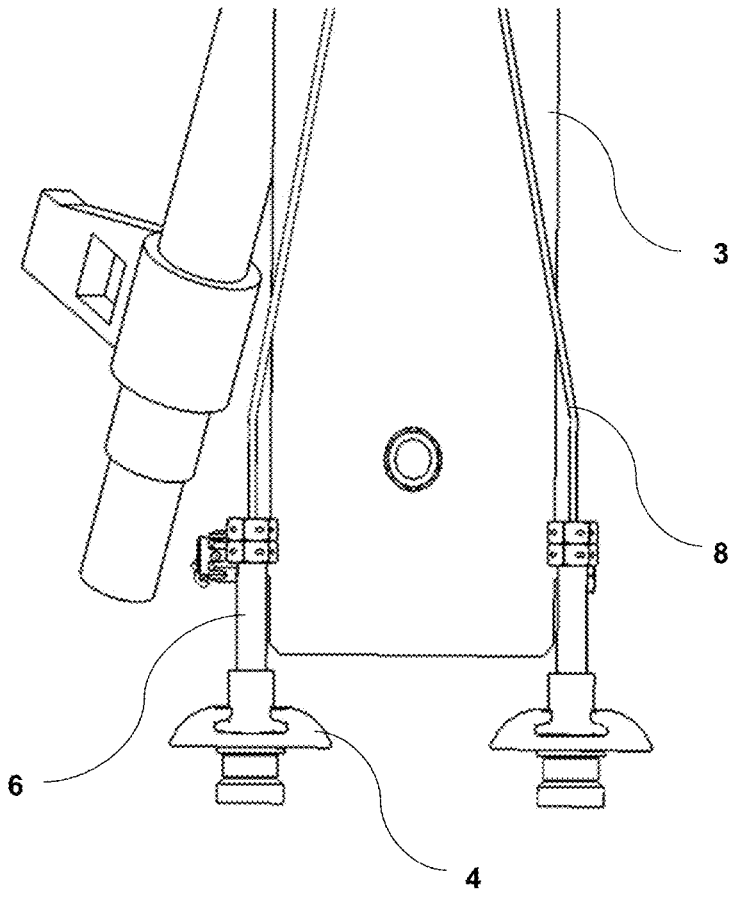
FIG. 3 is a perspective view of the pin in the locked position (I).
Figure 7:
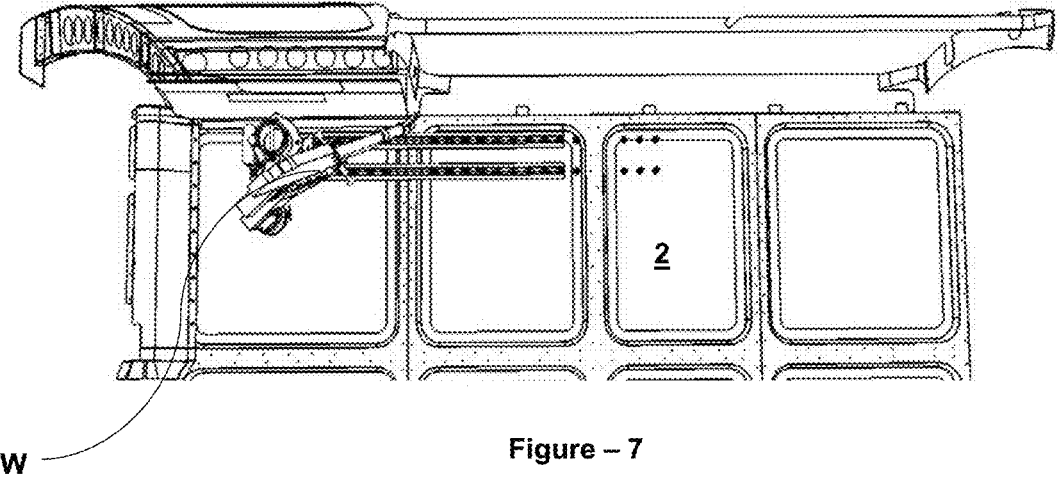
FIG. 7 is a perspective view of the body and weapon.

1901. First Protrusion Element
1902. Second Protrusion Element
(W) Weapon The placement system (1) comprises a body (2) located on an air vehicle; at least one weapon (W) located on the body (2) to attack a target; a carrier (3) that allows the weapon (W) on the body (2) to be moved and carried as desired by the user; at least one rail (4) which extends longitudinally on the body (2) and allows the carrier (3) to move in the direction it extends; a plurality of housings (5) located on the rail (4); at least one pin (6) located on the carrier (3) so as to be form-fitted and opposite to the housings (5); the pin (6) having a locked position (I) in which the pin (6) contacts the housing (5), thereby fixing the carrier (3) on the rail (4), and a free position (II) in which the user triggers the pin (6) to cut its contact with the housing (5) so that the carrier (3) can be moved and brought on the rail (4) (FIG. 1), (FIG. 2), (FIG. 3), (FIG. 7).

The placement system (1) according to the invention comprises the rail (4) on the carrier (3), which allows the pin (6) to be moved from the locked position (I) to the free position (II) when triggered by the user, wherein when the carrier (3) is brought to the desired position while the pin (6) is in the free position (II), the rail (4) is brought to the locked position (I) by the user releasing the arm (7), so that the pin (6) is held so as not to be disengaged from the rail (4) in the movement direction of the pin (6) from the locked position (I) to the free position (II).

Weapons (W) are located on the body (2), which is an air vehicle like a helicopter, in order to shoot at targets during the operation by the user, who is a soldier. The weapons (W) are located on the cylindrical carrier (3) after the operation is over. The carrier (3) is movably located on the rail (4). The user pulls the pin (6) to remove it from the housing (5) in order to change position of the weapon (W) in the cabin. The pin (6) moves into the free position (II) and the weapon (W) slides on the rail (4) together with the carrier (3). When the weapon (W) reaches the desired position, the user releases the pin (6), so that the pin (6) is inserted into the housing (5) and moved into the locked position (I).

When the pin (6) moves from the free position (II) to the locked position (I) or moves from the locked position (I) to the free position (II), the pin (6) moves on the rail (4) to contact the rail (4). The pin (6) is designed not to be disengaged from the rail (4). When the weapon (W) is in the position desired by the user, the pin (6) is brought to the locked position (I).

Figure 4:
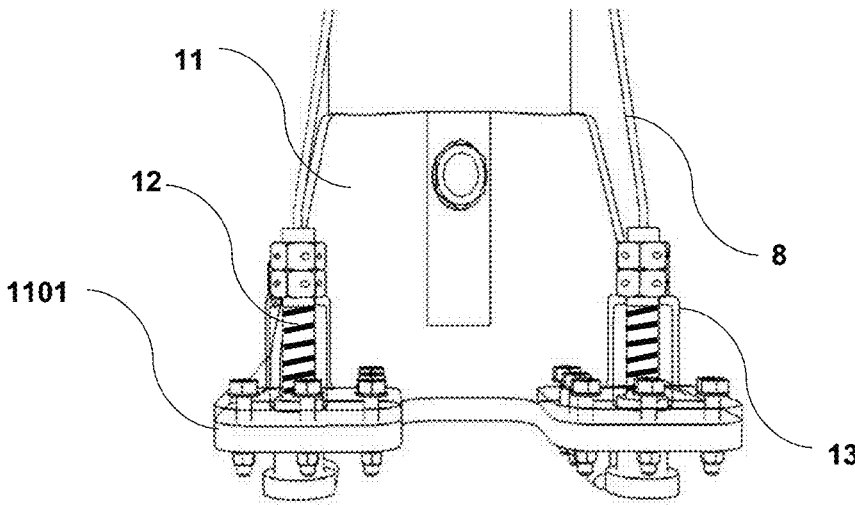
FIG. 4 is a perspective view of the pin spring and cover.

In an embodiment of the invention, the placement system (1) comprises at least one wire (8) with one end on the arm (7) and the other end on the pin (6), which allows the pin (6) to move from the locked position (I) to the free position (II) when the arm (7) is pulled by the user. The movement given by the user to the arm (7) is transferred to the pin (6) thanks to the wire (8) (FIG. 4).

In an embodiment of the invention, the placement system (1) comprises a first arm (701) movably located on the carrier (3); a second arm (702) located on the carrier (3) in a fixed manner so as to have substantially the same geometrical form as the first arm (701), wherein the first arm (701) slides on the second arm (702). The first arm (701) and the second arm (702) are interlocked (FIG. 5), (FIG. 6).

In an embodiment of the invention, the placement system (1) comprises the second arm (702) which allows the first arm (701) to move on the axis it extends when triggered by the user, and allows the movement of the first arm (701) to be restricted and stopped. Thanks to the interlocking first arm (701) and the second arm (702), when the first arm (701)

is pulled by the user, it stops by contacting the second arm (702). Therefore, when the pin (6) is in free position (II), it remains opposite to the housing (5) and the pin cannot be disengaged from the rail (4).

In an embodiment of the invention, the placement system (1) comprises a protrusion (9) extending from the first arm (701) towards the carrier (3); a channel (10) that restricts the movement of the first arm (701) by allowing the protrusion (9) to move on the carrier (3) along the direction it extends when the first arm (701) is triggered by the user. The protrusion (9) contacts the walls of the channel (10) by only sliding inside the channel (10), and the first arm (701) cannot rotate around itself.

In an embodiment of the invention, the placement system (1) comprises the protrusion (9) extending from the carrier (3) towards the first arm (701); the channel (10) that restricts the movement of the first arm (701) by allowing the protrusion (9) to move on the carrier (3) along the direction it extends when the first arm (701) is triggered by the user. The protrusion (9) contacts the walls of the channel (10) by only sliding inside the channel (10), and the first arm (701) cannot rotate around itself.

In an embodiment of the invention, the placement system (1) comprises a support piece (11) that surrounds the carrier (3); a first flange (1101) with the pin (6) thereon, which extends from the support piece (11) towards the rail (4) so as to at least partially cover the rail (4), and allows the pin (6) to contact the housing (5). The first flange (1101) is mounted removably so that it can be replaced by the user when deformed by fatigue or structural loads.

In an embodiment of the invention, the placement system (1) comprises a pin spring (12) which is located to surround the pin (6), and pushes the pin (6) towards the housing (5) to contact the housing (5) in order to bring the pin (6) from the free position (II) to the locked position (I) when the carrier (3) is moved by the user on the rail (4) to the desired position. The pin spring (12) applies a required force to the pin (6) for the pin (6) to move from the free position (II) to the locked position (I). In this way, when the first arm (701) is released, the pin (6) is inserted into the housing (5).

In an embodiment of the invention, the placement system (1) comprises a cover (13) located on the first flange (1101) to surround the pin (6) and the pin spring (12). The cover (13) allows the pin (6) and/or the pin spring (12) to be replaced with new ones in case of a deformation. By restricting the movement of the pin (6), it can be prevented from disengaging from the rail (4).

In an embodiment of the invention, the placement system (1) comprises a first carrier (301) with pin (6) and arm (7) thereon; a second carrier (302) on which the weapon (W) is located; a movement transfer arm (14) connected on one end to the first carrier (301) and on the other end to the second carrier (302). The movement transfer arm (14) transfers movement of the first carrier (301) to the second carrier (302). Thus, the degree of freedom of the movement of the weapon (W) is increased, so that the weapon (W) is brought to the desired position by the user.

Figure 9:
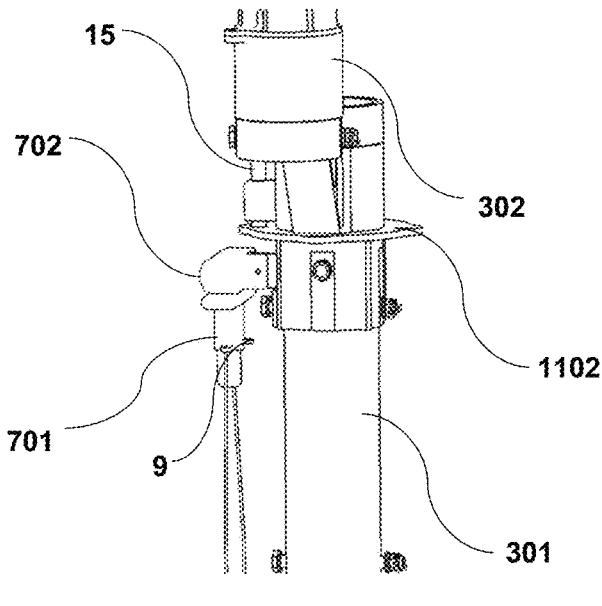
FIG. 9 is a perspective view of the locking element, protrusion, first arm and the second arm with the pin in the free position (II).
Figure 10:
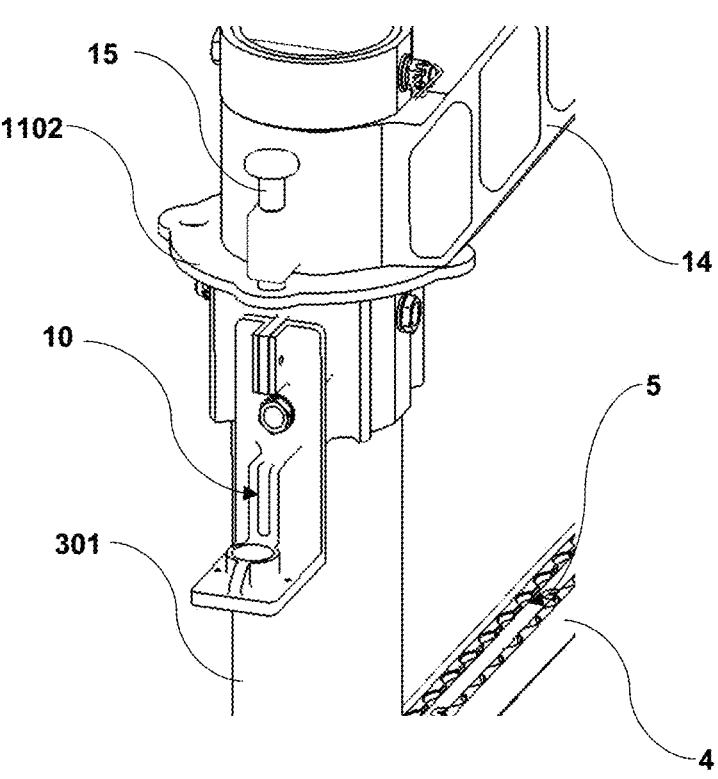
FIG. 10 is a perspective view of the channel, locking element, rail and housings.
Figure 11:
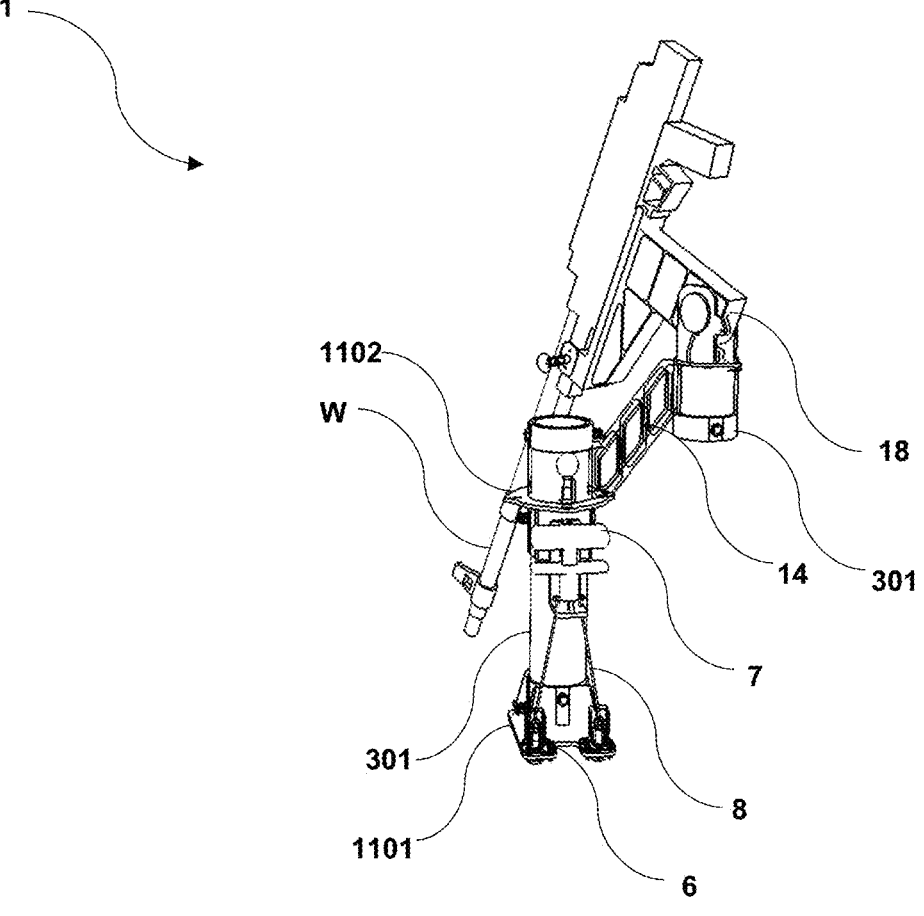
FIG. 11 is a perspective view of a placement system.

In an embodiment of the invention, the placement system (1) comprises a second flange (1102) extending outwardly over the first carrier (301) so as to contact the movement transfer arm (14); a locking element (15) that restricts the rotational movement of the movement transfer arm (14) around the direction in which the first carrier (301) extends. The locking element (15) fixes the movement transfer arm (14) to the second carrier (302), such that the recoil force caused by shooting the weapon (W) during an operation by the soldier is transmitted to the carrier (3) and reduced. Thus, operations are carried out more effectively by the military (FIG. 9), (FIG. 10), (FIG. 11).

In an embodiment of the invention, the placement system (1) comprises the body (2) located on the air vehicle which is a helicopter; an extension (16) extending outwardly from the second carrier (302) and allowing the movement of the weapon (W) on the second carrier (302) to be restricted, thus preventing the shooting direction of the weapon (W) from being aimed at the helicopter blades. It allows prevention of false shots to the helicopter blades that may occur as a result of situations such as injuries to soldiers or sudden maneuvers during the operation. The weapon (W) contacts the extension (16) and limits movement of the weapon (W).

In an embodiment of the invention, the placement system (1) comprises a movable carrier (17) which extends outward from the second carrier (302) and is located to rotate around the axis that the second carrier extends (302); a chamber (18) detachably mounted on the movable carrier (17), and on which the weapon (W) is located. The weapon is attached to the second carrier (302) via the chamber (18).

In an embodiment of the invention, the placement system (1) comprises the second arm (702) with a "T" shape; the first arm (701) which makes a sliding movement, when triggered by the user, on the cylindrical form of the second arm (702), and whose movement is restricted when it contacts the second arm (702). The first arm (701) restricts the movement of the second arm (701) by contacting each other and moving on the cylindrical part of the T form within the second arm (702).

Figure 8:
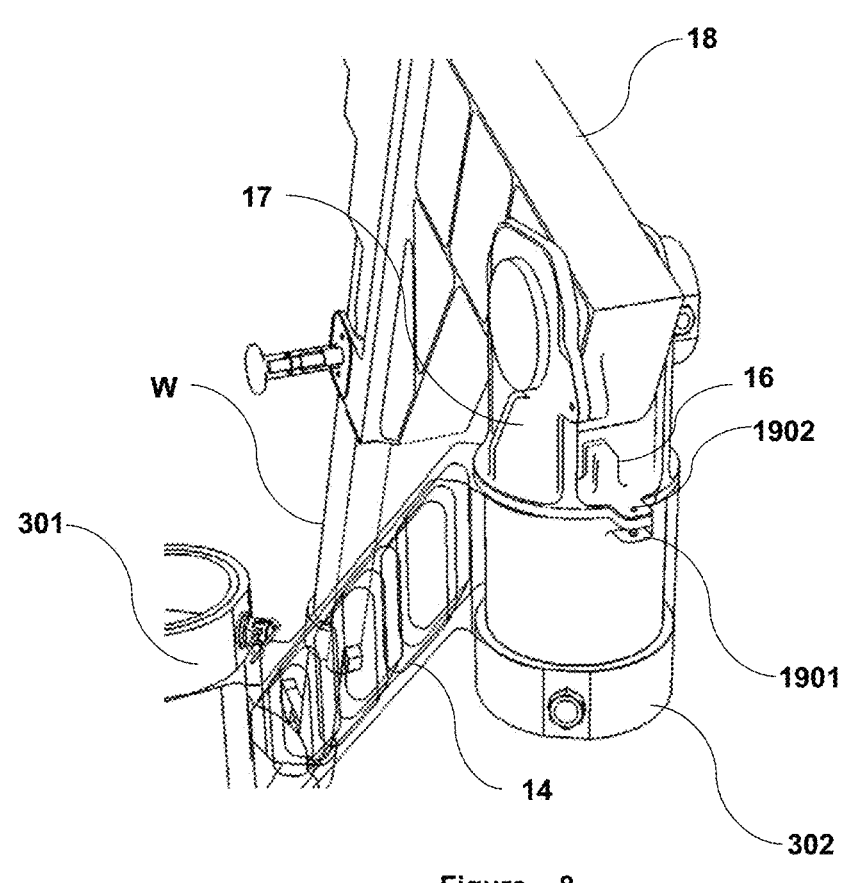
FIG. 8 is a perspective view of the first protrusion element, second protrusion element, extension, movable carrier and chamber.

In an embodiment of the invention, the placement system (1) comprises a first protrusion element (1901) extending outwardly from the second carrier (302); a second protrusion element (1902) extending outward from the chamber (18) and facing the first protrusion element (1901), allowing the chamber (18) and the second carrier (302) to be fixed by the user. The second protrusion element (1902) allows the weapon (W) to be fixed (FIG. 8).

The invention claimed is:

1. A placement system comprising: a body located on an air vehicle; at least one weapon (W) located on said body to attack a target; a carrier that allows said at least one weapon (W) on said body to be moved and carried as desired by a user; at least one rail which extends longitudinally on said body and allows said carrier to move in a direction that said at least one rail extends; a plurality of housings located on said at least one rail; at least one pin located on said carrier so as to be form-fitted and opposite to said housings; said at least one pin having a locked position (I) in which said at least one pin contacts a housing of said plurality of housings, thereby fixing said carrier on said at least one rail, and a free position (II) in which said user triggers said at least one pin to cut contact of said at least one pin with said housing so that said carrier can be moved and brought on said at least one rail; an arm located on said carrier, wherein said arm allows said at least one pin to be moved from said locked position (I) to said free position (II) when triggered by said user, wherein when said carrier is brought to a desired position while said at least one pin is in said free position (II), said at least one pin is brought to said locked position (I) by said user releasing said arm, so that said at least one pin is held so as not to be disengaged from said at least one rail in a movement direction of said at least one pin from said locked position (I) to said free position (II).

2. The placement system according to claim 1, further comprising: at least one wire with one end on said arm and another end on said at least one pin, which allows said at least one pin to move from said locked position (I) to said free position (II) when said arm is pulled by said user.

3. The placement system according to claim 1, further comprising: a first arm movably located on said carrier; a second arm located on said carrier in a fixed manner so as to have substantially the same geometrical form as said first arm, wherein said first arm slides on said second arm.

4. The placement system according to claim 3, wherein said second arm allows said first arm to move on an axis that said second arm extends when triggered by said user, and allows movement of said first arm to be restricted and stopped.

5. The placement system according to claim 3, further comprising: a protrusion extending from said first arm towards said carrier; a channel that restricts movement of said first arm by allowing said protrusion to move on said carrier along a direction that said first arm extends when said first arm is triggered by said user.

6. The placement system according to claim 3, further comprising: a protrusion extending from said carrier towards said first arm; a channel that restricts movement of said first arm by allowing said protrusion to move on said carrier along a direction that said first arm extends when said first arm is triggered by said user.

7. The placement system according to claim 1, further comprising: a support piece that surrounds said carrier; a first flange with said at least one pin thereon, which extends from said support piece towards said at least one rail so as to at least partially cover said at least one rail, and allows said at least one pin to contact said housing.

8. The placement system according to claim 1, further comprising: a pin spring which is located to surround said at least one pin, and pushes said at least one pin towards said housing to contact said housing in order to bring said at least one pin from said free position (II) to said locked position (I) when said carrier is moved by said user on said at least one rail to said desired position.

9. The placement system according to claim 8, further comprising: a cover located on said first flange to surround said at least one pin and said pin spring.

10. The placement system according to claim 1, further comprising: a first carrier with said at least one pin and said arm thereon; a second carrier on which said at least one weapon (W) is located; a movement transfer arm connected at one end to said first carrier and at another end to said second carrier.

11. The placement system according to claim 10, further comprising: a second flange extending outwardly over said first carrier so as to contact said movement transfer arm; a locking element that restricts rotational movement of said movement transfer arm around a direction in which said first carrier extends.

12. The placement system according to claim 10, wherein said body is located on said air vehicle which is a helicopter, said placement system further comprising: an extension extending outwardly from said second carrier and allowing movement of said at least one weapon (W) on said second carrier to be restricted, thus preventing a shooting direction of said at least one weapon (W) from being aimed at helicopter blades.

13. The placement system according to claim 10, further comprising: a movable carrier which extends outward from said second carrier and is located to rotate around an axis that said second carrier extends; a chamber detachably mounted on said movable carrier, and on which said at least one weapon (W) is located.

14. The placement system according to claim 13, further comprising: a first protrusion element extending outwardly from said second carrier; a second protrusion element extending outward from said chamber and facing said first protrusion element, allowing said chamber and said second carrier to be fixed by said user.

15. The placement system according to claim 10, further comprising: said second arm having a "T" shape; said first arm which makes a sliding movement, when triggered by said user, on a cylindrical form of said second arm, and whose movement is restricted when said first arm contacts said second arm.

* * * * *